United States Patent
Kim et al.

(10) Patent No.: US 9,817,497 B2
(45) Date of Patent: Nov. 14, 2017

(54) FLEXIBLE TOUCH WINDOW WITH REDUCED THICKNESS MESH ELECTRODE LAYER

(71) Applicant: LG INNOTEK CO., LTD., Seoul (KR)

(72) Inventors: Yoon Tai Kim, Seoul (KR); Hyung Mook Oh, Seoul (KR); Kweon Jin Lee, Seoul (KR); Soo Hong Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 35 days.

(21) Appl. No.: 14/788,836

(22) Filed: Jul. 1, 2015

(65) Prior Publication Data

US 2016/0004340 A1   Jan. 7, 2016

(30) Foreign Application Priority Data

Jul. 1, 2014  (KR) .......... 10-2014-0082140
Jul. 7, 2014  (KR) .......... 10-2014-0084775

(51) Int. Cl.
*G06F 3/041* (2006.01)
*G06F 3/044* (2006.01)

(52) U.S. Cl.
CPC .......... *G06F 3/041* (2013.01); *G06F 3/044* (2013.01); *G06F 2203/04103* (2013.01); *G06F 2203/04112* (2013.01)

(58) Field of Classification Search
CPC .......... G06F 3/041; G06F 3/044; G06F 2203/04103; G06F 2203/04112; G02F 2201/38; G02B 1/11
See application file for complete search history.

(56) References Cited

U.S. PATENT DOCUMENTS

| | | | | |
|---|---|---|---|---|
| 9,681,540 | B2* | 6/2017 | Lee ................ | H05K 1/0306 |
| 2012/0044187 | A1* | 2/2012 | Polishchuk ......... | G06F 3/044 345/174 |
| 2012/0313880 | A1* | 12/2012 | Geaghan ........... | G06F 3/044 345/173 |
| 2013/0075266 | A1 | 3/2013 | Kim et al. | |
| 2013/0135224 | A1* | 5/2013 | Lee ................ | G06F 3/044 345/173 |
| 2014/0078421 | A1* | 3/2014 | Zhou ............... | G06F 3/0412 349/12 |
| 2014/0116863 | A1 | 5/2014 | Lee et al. | |

(Continued)

FOREIGN PATENT DOCUMENTS

| | | |
|---|---|---|
| KR | 10-2013-0033679 A | 4/2013 |
| KR | 10-2014-0041138 A | 4/2014 |
| KR | 10-2014-0054735 A | 5/2014 |

OTHER PUBLICATIONS

European Search Report for European Patent Application No. 15173699 which corresponds to the above-identified U.S. application.

*Primary Examiner* — Larry Sternbane
(74) *Attorney, Agent, or Firm* — LRK Patent Law Firm

(57) ABSTRACT

A touch window includes a substrate, and an electrode part on the substrate. The sensing electrode includes a base substrate formed with a pattern part, and an electrode layer on the pattern part, where the electrode layer has a thickness in a range of 0.03 μm to 3 μm.

17 Claims, 11 Drawing Sheets

(56) References Cited

U.S. PATENT DOCUMENTS

| | | | | |
|---|---|---|---|---|
| 2014/0138133 A1* | 5/2014 | Byun | .................... | H05K 1/097 174/257 |
| 2014/0255667 A1* | 9/2014 | Kim | ......................... | B32B 3/10 428/201 |
| 2015/0177871 A1* | 6/2015 | Kim | ....................... | G06F 3/044 345/174 |

* cited by examiner

FLEXIBLE TOUCH WINDOW WITH REDUCED THICKNESS MESH ELECTRODE LAYER

BACKGROUND

1. Field of the Invention

The embodiment relates to a touch window.

2. Description of Related Art

Recently, a touch window, which performs an input function through the touch of an image displayed on a display by an input device such as a stylus pen or a hand, has been applied to various electronic appliances.

Indium tin oxide (ITO), which has been most extensively used for a transparent electrode of the touch window, is costly, and is easily subject to physical damage due to the bending or the warping of a substrate, so that the characteristic of the ITO for the electrode is deteriorated. Accordingly, the ITO is not suitable for a flexible device. In addition, when the ITO is applied to a large touch panel, a problem may occur due to high resistance.

In order to solve the problem, research and studies on an alternative electrode have been performed actively. For example, a study for substituting an electrode material for ITO by forming the electrode material in a mesh shape has been performed. The electrode having the mesh shape may be formed through various schemes by using various materials.

For example, the electrode having the mesh shape may be formed by using metallic paste. However, the metallic paste may not be sufficiently filled when the electrode having a narrow line width is formed, so that a defect may be generated, thereby deteriorating the reliability.

Therefore, there is a need to provide a touch window having a new structure which may solve the above-mentioned problems.

SUMMARY

The embodiment is to provide a touch window having improved reliability.

According to an embodiment, there is provided a touch window which includes a substrate; and an electrode part on the substrate, wherein the sensing electrode includes a base substrate formed with a pattern part; and an electrode layer on the pattern part, and the electrode layer has a thickness in a range of 0.03 µm to 3 µm.

According to the touch window of the embodiment, the thickness of the electrode part may be reduced. In detail, since the electrode part, that is, the electrode layer constituting a sensing electrode and a wire electrode is formed as a plating layer, even though the electrode part is disposed at a thin thickness, the electric property may be maintained. Thus, the thickness of the electrode part may be reduced so that the entire thickness of the touch window may be reduced.

In addition, since the electrode layer is formed as the plating layer, the electrode layer may be disposed on the pattern part at a uniform thickness and the electrode layer disposed on each pattern part may be made to have a uniform property, so that the reliability of the touch window may be improved.

In addition, an oxide layer, which may serve as an anti-reflective layer, may be formed by oxidizing a part of the electrode layer. Thus, the electrode layer itself may perform an anti-reflective function without forming any additional anti-reflective layers, so that the visibility of the touch window may be improved and the appearance may be prevented from being deteriorated due to the formation of the anti-reflective layer.

DETAILED DESCRIPTION OF THE EMBODIMENTS

Figure 1:
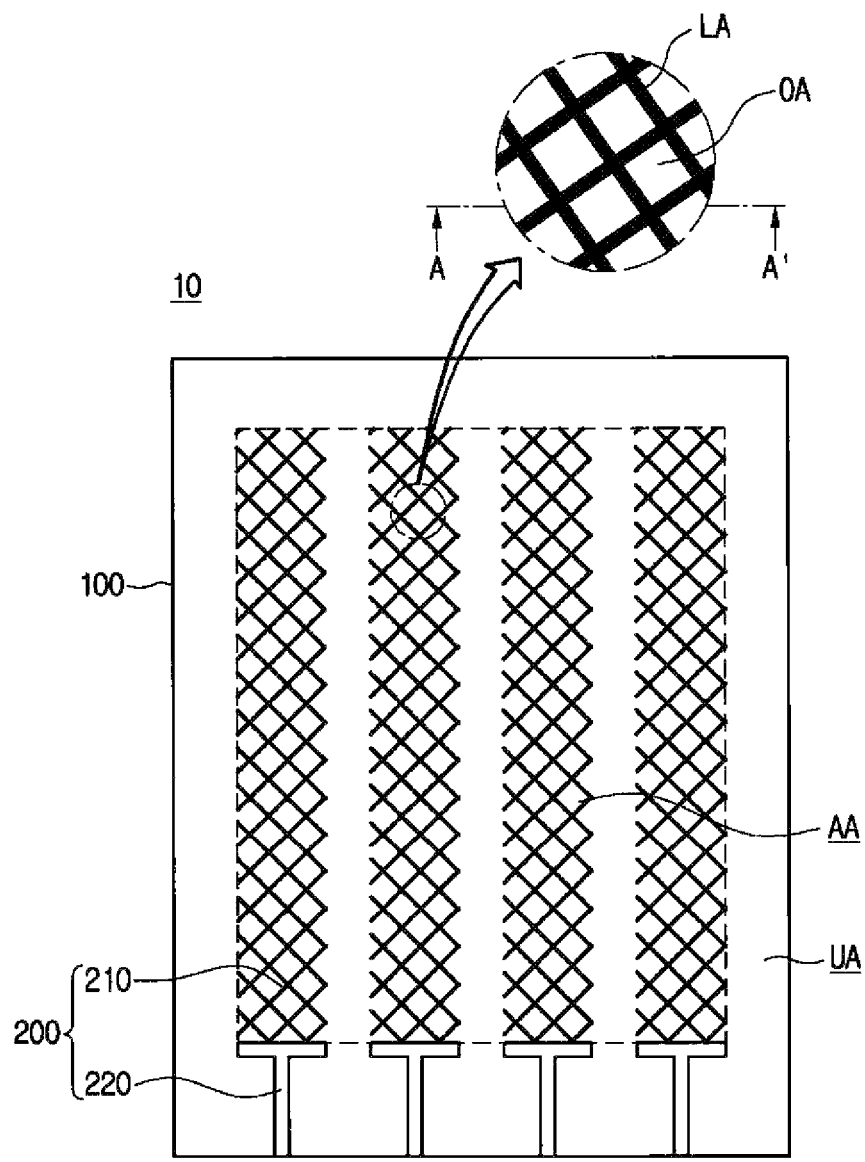
FIG. 1 is a plan view showing a touch window according to the embodiment.

In the following description of the embodiments, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

In the following description, when a part is connected, to the other part, the parts are not only directly connected to each other, but also indirectly connected to each other while interposing another part therebetween. In addition, when a predetermined part "includes" a predetermined component, the predetermined part does not exclude other components, but may further include other components unless otherwise indicated.

The thickness and size of each layer shown in the drawings may be exaggerated, omitted or schematically drawn for the purpose of convenience or clarity. In addition, the size of elements does not utterly reflect an actual size.

Referring to FIG. 1, a touch window according to an embodiment may include a substrate 100 and an electrode part 200 on the substrate 100.

The substrate 100 may be flexible or rigid.

For example, the substrate 100 may include glass or plastic. In detail, the substrate 100 may include chemically tempered/semi-tempered glass, such as soda lime glass or aluminosilicate glass, reinforced/flexible plastic, such as polyimide (PI), polyethylene terephthalate (PET), propylene glycol (PPG), or poly carbonate (PC), or sapphire.

In addition, the substrate 100 may include an optically isotropic film. For example, the substrate 100 may include cyclic olefin copolymer (COC), cyclic olefin polymer (COP), optically isotropic polycarbonate (PC), or optically isotropic polymethyl methacrylate (PMMA).

The sapphire has superior electric characteristics, such as permittivity, so that a touch response speed may be greatly increased and a space touch such as hovering may be easily implemented. In addition, since the sapphire has high surface hardness, the sapphire is applicable to a cover substrate. The hovering refers to a technique of recognizing coordinates even at a slight distance from a display.

In addition, the substrate 100 may be bent to have a partial curved surface. That is, the substrate 100 may be bent to have a partial flat surface and a partial curved surface. In detail, an end of the substrate 100 may be bent to have a curved surface or may be bent or flexed to have a surface including a random curvature.

In addition, the substrate 100 may include a flexible substrate having a flexible property.

Further, the substrate 100 may include a curved or bended substrate. That is, a touch window including the substrate 100 may be formed to have a flexible, curved or bended property. For this reason, the touch window according to the embodiment may be easily portable and may be variously changed in design.

The substrate may include a cover substrate. In addition, the cover substrate may be additionally disposed on the substrate. The substrate 100 and the cover substrate may be combined or adhere to each other while interposing an adhesive layer therebetween. Thus, since the substrate and the cover substrate may be formed separately, it may be favorable to massively produce the touch window.

The substrate 100 may have an active area AA and an unactive area UA defined therein.

An image may be displayed in the active area AA. The image is not displayed in the unactive area UA provided at a peripheral portion of the active area AA.

In addition, the position of an input device (e.g., a finger, a stylus pen, etc.) may be sensed in at least one of the active area AA and the unactive area UA. If the input device, such as a finger, touches the touch window, the variation of capacitance occurs in the touched part by the input device, and the touched part subject to the variation of the capacitance may be detected as a touch point.

The substrate 100 may support the electrode part 200. That is, the substrate 100 may be a support substrate of supporting the electrode part 200.

The substrate 100 may have an active area AA and an unactive area UA defined therein.

An image may be displayed in the active area AA. The image is not displayed in the unactive area UA provided at a peripheral portion of the active area AA.

In addition, the position of an input device (e.g., a finger) may be sensed in at least one of the active area AA and the unactive area UA. If the input device, such as a finger, touches the touch window, the variation of capacitance occurs in the touched part by the input device, and the touched part subject to the variation of the capacitance may be detected as a touch point.

The electrode part 200 may be disposed on the substrate 100. The electrode part 200 may include a sensing electrode 210 and/or a wire electrode 220.

The sensing electrode 210 may be disposed on at least one of the active area AA and the unactive area UA. Preferably, the sensing electrode 210 may be disposed on the active area AA of the substrate.

The sensing electrode 210 may include a transparent conductive material that allows electricity to flow therethrough without interrupting transmission of light. For example, the sensing electrode 210 may include metal oxide such as indium tin oxide (ITO), indium zinc oxide (IZO), copper oxide, tin oxide, zinc oxide, or titanium oxide. Since the transparent material is disposed on a sensing active area, a degree of freedom may be improved when the pattern of the sensing electrode is formed.

Differently from the above, the sensing electrode 210 may include a nanowire, a photo sensitive nanowire film, a carbon nanotube (CNT), graphene, conductive polymer or a mixture thereof. Thus, when a flexible or bendable touch window is manufactured, the degree of freedom may be improved.

When a nano-composite such as a nanowire or a carbon nanotube (CNT) is used, the sensing electrode 300 may have a black color and control the color and reflectance while securing electric conductivity through the content control of nano-powder.

In addition, the sensing electrode 210 may include various metals. For example, the sensing electrode 210 may include at least one of Cr, Ni, Cu, Al, Ag, Mo, Au, Ti and the alloy thereof. Thus, when a flexible or bendable touch window is manufactured, the degree of freedom may be improved.

The sensing electrode 210 may be formed in a mesh shape. In detail, the sensing electrode 210 may include a plurality of sub-electrodes. The sub-electrodes may be disposed in a mesh shape while crossing each other.

If an electrode pattern may be viewed from the outside, the visibility may be deteriorated. Preferably, a line width of the mesh line LA may be in the range of about 0.5 µm to about 7 µm. More preferably, the line width of the mesh line may be in the range of about 1 µm to about 3.5 µm.

In addition, the mesh opening may be formed in various shapes. For example, the mesh opening OA may have various shapes such as a polygonal shape including a rectangular shape, a diamond shape, a pentagonal shape or a hexagonal shape, or a circular shape. In addition, the mesh opening may be formed in a regular or random shape.

The sensing electrode 210 may have a mesh shape, so that the pattern of the sensing electrode 210 may not be viewed on the active area AA, for example, a display area. That is, even though the sensing electrode is formed of metal, the sensing electrode may not be viewed. In addition, even though the sensing electrode is applied to a large-size touch window, the resistance of the touch window may be lowered. In addition, the sensing electrode and the wire electrode may be simultaneously patterned by using the same material.

The wire electrode 220 may be disposed on the unactive area of the substrate 100.

The wire electrode 220 may be connected to the sensing electrode 210, may extend toward the unactive area UA and may be connected to a printed circuit board on the unactive area UA.

The wire electrode 220 may include a material equal to or similar to that of the sensing electrode 210. In addition, the wire electrode 220 may include a mesh shape like the sensing electrode 210.

Hereinafter, a touch window according to an embodiment will be described with reference to FIGS. 2 to 4.

Figure 2:
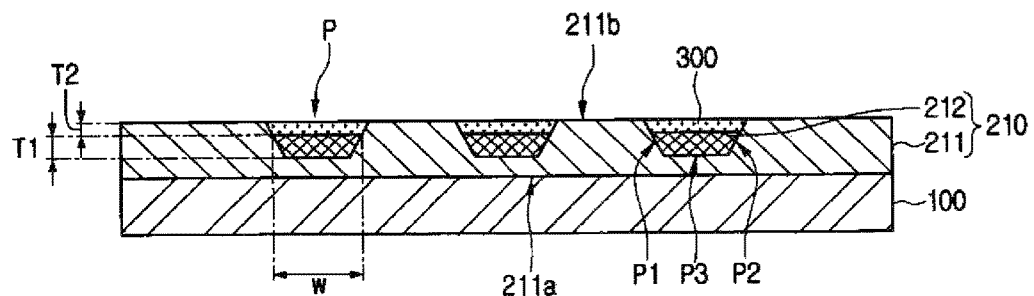
FIG. 2 is a sectional view taken along line A-A' of FIG. 1.
Figure 3:
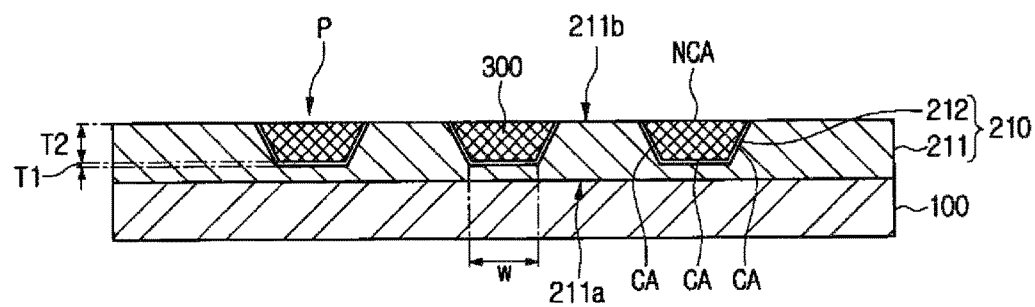
FIG. 3 is another sectional view taken along line A-A' of FIG. 1.
Figure 4:
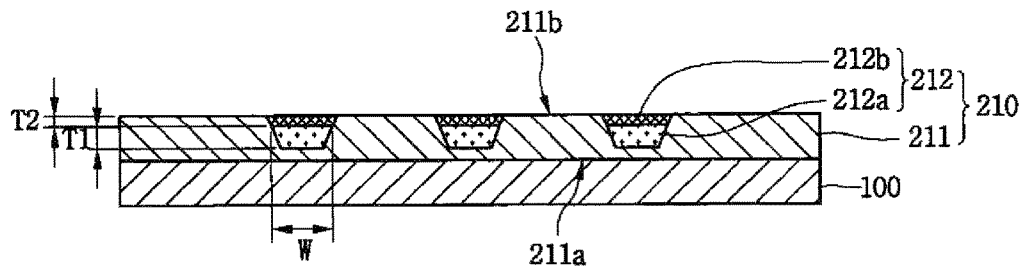
FIG. 4 is still another sectional view taken along line A-A' of FIG. 1.

FIGS. 2 to 4 are sectional views showing various touch windows according to embodiments.

Referring to FIG. 2, the touch window according to an embodiment may include a base substrate 211 on a substrate 100 and an electrode layer 212 on the base substrate 211.

The base substrate 211 may include plastic. For example, the base substrate 211 may include resin. The base substrate 211 may include UV resin, photocurable resin or thermosetting resin.

The base substrate 211 may include a pattern part P. Although a concave pattern part P formed on the base substrate 211 is depicted in FIG. 2, but the embodiment is not limited thereto and a convex pattern part may be formed.

The pattern part P may be formed in a mesh shape. In detail, the pattern part P may be formed in a mesh shape while crossing each other.

A width of the pattern part P may be gradually enlarged as the pattern part P extends from a bottom surface to a top surface of the base substrate 211. In detail, the base substrate 211 may include a bottom surface 211a making contact with the substrate 100 and a top surface 211b opposite to the bottom surface 211a, and the width of the pattern part P may be enlarged as the pattern part P extends from the bottom surface 211a to the top surface 211b. Thus, the process of forming an electrode layer in the pattern part may be easily performed.

The electrode layer 212 may be disposed on the base substrate 211. In detail, the electrode layer 212 may be disposed on the pattern part P on the base substrate 211. For example, the electrode layer 212 may be disposed in the pattern part P. Thus, the electrode layer 212 may be disposed on the base substrate 211 in a mesh shape. In addition, similarly to the shape of the pattern part, a width of the electrode layer 212 may be gradually enlarged as the electrode layer 212 extends from the bottom surface 211a to the top surface 211b of the base substrate 211. Thus, the process of forming the electrode layer in the pattern part may be easily performed. For example, when the width of the bottom surface is larger, a gap may be formed between the electrode layer and the pattern part. However, when the width of the top surface is larger, the electrode layer may be formed between the pattern parts without any gaps.

The electrode layer 212 may include at least one of the sensing electrode and the wire electrode described above. In addition, the electrode layer 212 may include the conductive material described above.

In addition, the electrode layer 212 may be a plating layer. In detail, the electrode layer 212 may be disposed in the pattern part P through an electroless plating scheme. Thus, the electrode layer may be formed to have a constant thickness and the thickness of the electrode layer may be reduced.

The electrode layer 212 may be formed to have a constant thickness. The thickness T1 of the electrode layer 212 may be equal to or less than about 3 µm. In detail, the electrode layer 212 may be formed to have a thickness in the range of about 0.03 µm to about 3 µm. In more detail, the electrode layer 212 may be formed to have a thickness in the range of about 0.1 µm to about 1.5 µm.

When the thickness of the electrode layer 212 is less than 0.03 µm, the electrode resistance may be increased so that the efficiency may be reduced. When the thickness of the electrode layer 212 exceeds about 0.03 µm, the sensing electrode becomes thick, so that the entire thickness of the touch window may be increased, thereby deteriorating the process efficiency.

In addition, the electrode layer 212 may have a constant width. In detail, the width W of the electrode layer 212 may have, for example, an average of about 4 µm or less, so that the pattern of the electrode layer 212 may not be viewed from an outside. In detail, the electrode layer 212 may have a width in the range of about 1 µm to about 4 µm.

The electrode layer 212 may make contact with at least one of inner side surfaces of the pattern part P. In detail, the pattern part P may include first and second surfaces P1 and P2, and a third surface P3 for connecting the first and second surfaces P1 and P2 to each other. The electrode layer 212 may make contact with at least one of the first to third surfaces P1 to P3. Thus, a gap may be prevented from being formed between the electrode layer and the pattern part.

The electrode layer 212 may make contact with at least one of the first to third surfaces P1 to P3 and may be disposed to fill a portion of the pattern part P.

An anti-reflective layer 300 may be further disposed on the electrode layer 212. In detail, the anti-reflective layer 300 may be disposed on the electrode layer 212 in the pattern part P.

The anti-reflective layer 300 may be nontransparent and have a black-based color. For example, the anti-reflective layer 300 may include at least one of black, gray and a mixed color thereof. That is, the anti-reflective layer 300 may be a blackened layer.

The electrode layer 212 and the anti-reflective layer 300 may be disposed in the pattern part P to have mutually different thicknesses. In detail, referring to FIG. 2, the thickness T1 of the electrode layer 212 may be thicker than that T2 of the anti-reflective layer 300. Thus, the entire thickness of the touch window may be reduced while it is advantageous to signal transmission.

The anti-reflective layer 300 may be disposed on at least one surface of the electrode layer 212 to prevent the electrode layer 212 formed of metal from being oxidized and from reflecting light due to the total-reflection property of the metal.

In addition, the anti-reflective layer 300 may be black metal oxide. For example, the anti-reflective layer 300 may include at least one of CuO, CrO, FeO and Ni2O3, but the embodiment is not limited thereto. If In other words, the anti-reflective layer 400 may employ a black-based material to block the reflectance of the electrode layer 300

The anti-reflective layer 300 and the electrode layer 212 may be formed at the same time or may be formed through separated processes.

Referring to FIG. 3, the touch window according to an embodiment may include, a base substrate 211 on a substrate 100 and an electrode layer 212 on the base substrate 211. In the following description of FIG. 3, the details of the parts identical or similar to those of FIG. 2 described above will be omitted.

As shown in FIG. 3, the electrode layer 212 may be disposed only on an inner side surface of the pattern part. That is, the pattern part P may be disposed to make contact with at least one of the first to third surfaces P1 to P3. In detail, the electrode layer 212 may be disposed in a shape corresponding to at least one of the first to third surfaces P1 to P3.

In addition, the anti-reflective layer 300 may be disposed on the electrode layer 212. In detail, the anti-reflective layer 300 may be partially surrounded by the electrode layer 212.

For example, referring to FIG. 3, the anti-reflective layer 300 may include a contact surface CA making contact with the electrode layer 212 and a contactless surface NCA exposed to an outside without making contact with the electrode layer 212.

That is, the anti-reflective layer 300 may be partially surrounded by the electrode layer 212 due to the contact surface CA of the anti-reflective layer 300.

In addition, the contact surface CA and the contactless surface NCA may have mutually different sizes. In detail, the area or length of the contact surface CA may be greater than that of the contactless surface NCA. Thus, the surface reflection of the electrode layer may be effectively prevented.

The electrode layer 212 and the anti-reflective layer 300 may be disposed in the pattern part P to have mutually different thicknesses. In detail, the thickness T1 of the electrode layer 212 may be less than that T2 of the anti-reflective layer 300. Thus, the strength of the substrate formed with the electrode layer may be enhanced.

Referring to FIG. 4, the touch window according to a still another embodiment may include a base substrate 211 on a substrate 100 and an electrode layer 212 on the base substrate 211. In the following description, the details about the parts identical or similar to those of FIGS. 2 and 3 will be omitted.

Referring to FIG. 4, the electrode layer 212 may include a metal layer 212a and a metal oxide layer 212b. In detail, the electrode layer 212 may include the metal layer 212a disposed in the pattern part P and the metal oxide layer 212b on the metal layer 212a.

A width of at least one of the metal layer 212a and the metal oxide layer 212b may be gradually enlarged as it extends from a bottom surface 211a of the base substrate to a top surface 211b of the base substrate. Thus, when the electrode layer is formed, a gap may not be formed between the electrode layer and the pattern part.

In addition, the electrode layer 212 may include a conductive layer and a non-conductive layer. In detail, the electrode layer 212 may include the conductive layer disposed in the pattern part P and the non-conductive layer on the conductive layer.

That is, the conductive layer may be a metal layer 212a. In addition, the non-conductive layer may be the metal oxide layer 212b.

In addition, the conductive layer 212 may include a high-conductive layer and a low-conductive layer. In detail, the electrode layer 212 may include the high-conductive layer disposed in the pattern part P and the low-conductive layer on the high-conductive layer.

That is, the metal layer 212a may be a high-conductive layer. In addition, the metal oxide layer 212b may be a low-conductive layer.

The metal layer 212a and the metal oxide layer 212b may be formed integrally with each other.

In addition, the electrode layer 212, that is, the metal layer 212a and the metal oxide layer 212b may be plating layers. In detail, the electrode layer 212 may be disposed in the pattern part P through an electroless plating scheme.

The electrode layer 212 may include the conductive material described above. For example, the conductive layer 212 may include the metal described above.

In addition, the metal layer 212a and the metal oxide layer 212b may include the same material, that is, the same metal. That is, the metal oxide layer 212b may be provided by oxidizing one area of the metal layer 212a. Thus, a pattern may be formed by oxidizing a metal layer after forming the metal layer in the pattern without separately forming the metal layer and the metal oxide layer.

The metal oxide layer 212b may have a color. For example, the metal oxide layer 212b may have a black-based color. In detail, the metal oxide layer 212b may include at least one of black, gray and a mixed color thereof.

The metal oxide layer 212b may prevent reflection. In detail, the metal oxide layer 212b may be disposed on the metal layer 212a, so that the metal layer may be prevented from being viewed due to the glitter of the metal layer. That is, the metal oxide layer 212b may be an anti-reflective layer. In addition, the metal oxide layer 212b may be a blackened layer.

The metal oxide layer 212b may be disposed on at least one surface of the metal layer 212a, so that the metal layer 212a formed of a metal may be prevented from being oxidized and reflecting light due to the total reflection property of the metal.

In addition, the metal oxide layer 212b may be black metal oxide. For example, the metal oxide layer 212b may include at least one of CuO, CrO, FeO and $Ni_2O_3$, but the embodiment is not limited thereto. If it is possible to prevent the metal layer 212a from reflecting light, any black-based materials may be applied without limitation.

The metal oxide layer 212b and the metal layer 212a may be formed at the same time or through each process.

In addition, the electrode layer 212 may be a plating layer. In detail, the metal layer 212a and the metal oxide layer 212b may be disposed in the pattern part P through an electroless plating scheme.

The electrode layer 212 may have a constant thickness. A thickness T1 of the metal layer 212a may be equal to about 3 μm or less. In detail, the metal layer 212a may have a thickness in the range of about 0.03 μm to about 3 μm. In more detail, the metal layer 212a may have a thickness in the range of about 0.1 μm to about 1.5 μm.

When the thickness of the metal layer 212a is formed to be less than about 0.03 μm, the electrode resistance is increased, so that the efficiency may be reduced. When the thickness of the metal layer 212a is formed to exceed about 0.03 μm, the sensing electrode becomes thick, so that the entire thickness of the touch window may be greater, thereby reducing the process efficiency.

In addition, the metal layer 212a and the metal oxide layer 212b may have mutually different thicknesses. In detail, the metal layer 212a may have a thickness greater than the metal oxide layer 212b. For example, the thickness ratio of the metal layer 212a and the metal oxide layer 212b may be in the range of about 6:4 to about 9:1. For this reason, the anti-reflective function may be implemented while the signal transfer capability of the electrode layer is increased.

When the thickness ratio of the metal layer 212a and the metal oxide layer 212b may be less than about 6:4, the thickness of the metal oxide layer 212b is too thinned, so that the electrical property may be deteriorated. When the thickness ratio exceeds about 9:1, the thickness of the metal oxide layer 212b is too thinned, so that the metal oxide layer 212b may not perform the anti-reflective function, thereby deteriorating the visibility.

In addition, the metal layer 212a may have a constant width. In detail, the metal layer 212a may have a width W, for example, an average width of about 4 μm or less, so that the pattern of the metal layer 212a may not be viewed from an outside. In more detail, the electrode layer 212 may have a width in the range of about 1 μm to about 4 μm.

FIGS. 5 to 8 are views illustrating a process of forming an electrode part according to an embodiment. In detail, FIGS. 5 to 8 are views illustrating a process of forming an electrode part according to the first embodiment.

Figure 5:
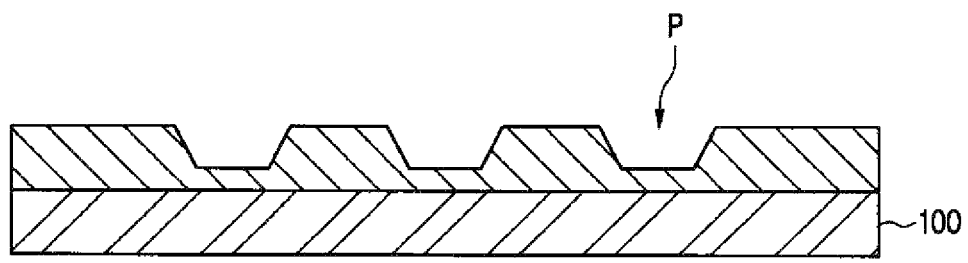
FIGS. 5 to 8 are views illustrating a process of forming the electrode part of FIG. 2.

Referring to FIG. 5, the base substrate 211 may be disposed on the substrate 100. Then, the pattern part P may be formed at a constant width and height on the base substrate 211. In detail, the pattern part P having a mesh shape may be formed on the base substrate 211.

Figure 6:
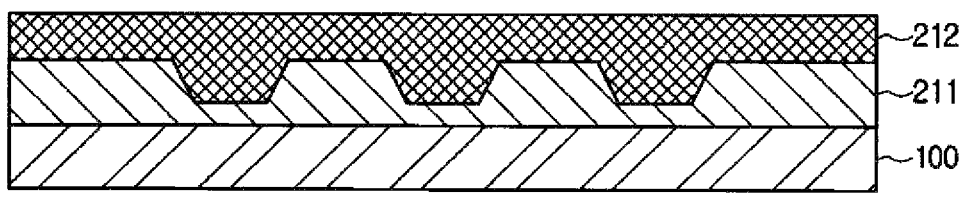

Next, referring to FIG. 6, the electrode layer 212 may be disposed on the base substrate 211. In detail, the metal electrode layer may be disposed on the base substrate 212.

The electrode layer 212 may be disposed on the base substrate 211 while filling the pattern part P. The electrode layer 212 may be deposited through an electroless plating scheme. By directly depositing the electrode layer 212 through the electroless plating scheme, the metal having a more excellent electric property than paste may be directly deposited on the base substrate. Thus, the electrode layer may be deposited at a thin thickness, so that the thickness of the electrode layer may be reduced.

In addition, since the electrode layer is deposited through the electroless plating scheme, the electrode layer may be deposited on the pattern part at a more uniform thickness when compared to the paste coating scheme.

Therefore, according to an embodiment, the thickness of the electrode part, that is, the thicknesses of the sensing electrode and the wire electrode may be reduced so that the thickness of the touch window may be reduced. In addition, since the electrode layer may be disposed at a uniform thickness, the reliability of the touch window may be improved.

Figure 7:
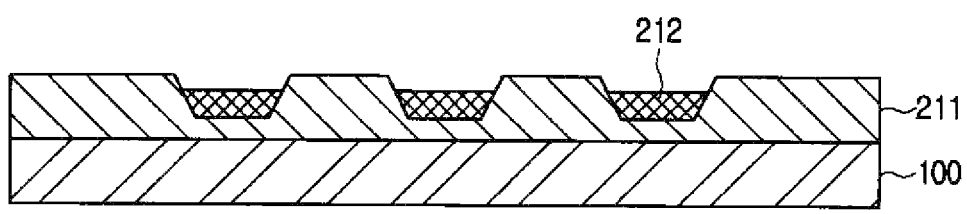

Referring to FIG. 7, the electrode layer 212 may be etched. In detail, the electrode layer may be removed through the etching except for a part of the electrode layer disposed in the pattern part 212 on the base substrate 211.

Figure 8:
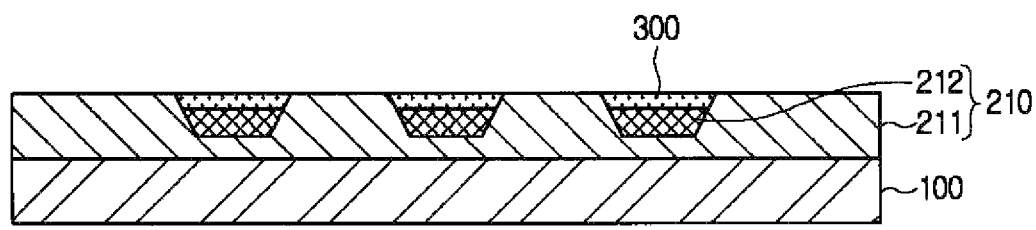

Next, referring to FIG. 8, the anti-reflective layer 300 may be disposed on the electrode layer 212. The anti-reflective layer 300 may be formed by using a black pigment.

FIGS. 9 to 12 are views illustrating a process of forming an electrode part according to another embodiment. In detail, FIGS. 9 to 12 are views illustrating a process of forming the electrode part of FIG. 3.

Figure 9:
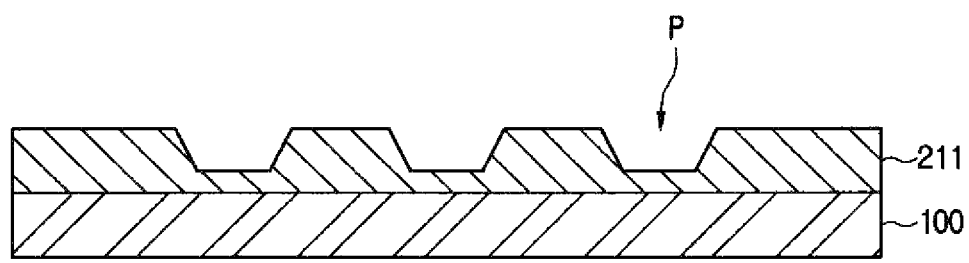
FIGS. 9 to 12 are views illustrating a process of forming the electrode part of FIG. 3.

Referring to FIG. 9, the base substrate 211 may be disposed on the substrate 100. Then, the pattern part P may be formed at a constant width and height on the base substrate 211. In detail, the pattern part P having a mesh shape may be formed on the base substrate 211.

Figure 10:
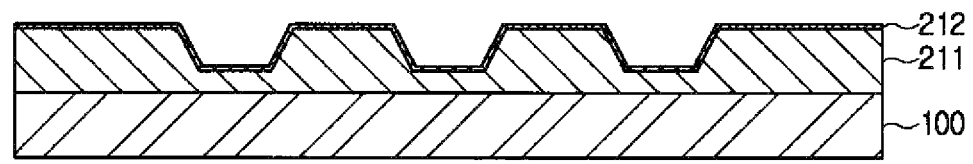

Next, referring to FIG. 10, the electrode layer 212 may be disposed on the base substrate 211. In detail, the metal electrode layer may be disposed on the base substrate 212.

The electrode layer 212 may be disposed on the base substrate 211 while filling the pattern part P. The electrode layer 212 may be disposed on a top surface of the base substrate 211 and an inner surface of the pattern part P. That is, the electrode layer 212 may be disposed on the top surface of the base substrate 211 and the inner surface of the pattern part P at a uniform thickness.

The electrode layer 212 may be deposited through an electroless plating scheme. By directly depositing the electrode layer 212 through the electroless plating scheme, the metal having a more excellent electric property than paste may be directly deposited on the base substrate. Thus, the electrode layer may be deposited at a thin thickness, so that the thickness of the electrode layer may be reduced.

In addition, since the electrode layer is deposited through the electroless plating scheme, the electrode layer may be deposited on the pattern part at a more uniform thickness when compared to the paste coating scheme.

Therefore, according to an embodiment, the thickness of the electrode part, that is, the thicknesses of the sensing electrode and the wire electrode may be reduced so that the thickness of the touch window may be reduced. In addition, since the electrode layer may be disposed at a uniform thickness, the reliability of the touch window may be improved.

Figure 11:
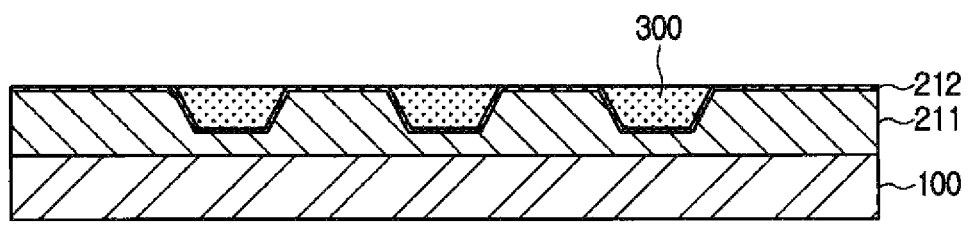

Referring to FIG. 11, the anti-reflective layer 300 may be disposed on the base substrate 212. In detail, the anti-reflective layer may be disposed in the pattern part P. The anti-reflective layer 300 may be disposed while filling the pattern part P.

Figure 12:
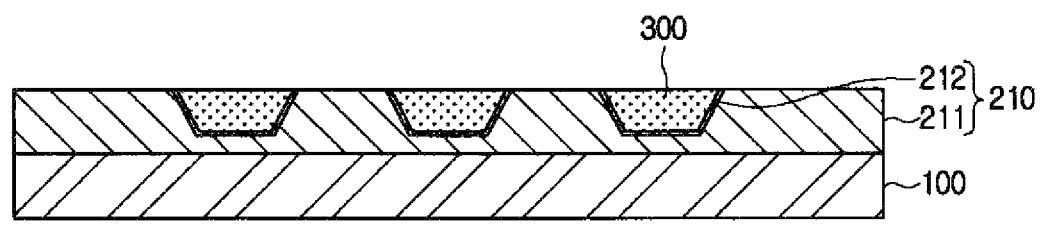

Then, referring to FIG. 12, the electrode layer 300 may be etched. In detail, the electrode layer may be removed through the etching except for a part of the electrode layer 300 disposed in the pattern part 212 on the base substrate 211.

As described above, after the anti-reflective layer is first disposed, the electrode layer is etched, so that the reflective layer may be operated as a mask when the electrode layer is etched. In addition, the blackened layer is disposed on the electrode layer, so that the outer appearance may be prevented from being damaged when the anti-reflective layer is formed.

FIGS. 13 to 16 are views illustrating a process of forming an electrode part according to still another embodiment. FIGS. 13 to 16 are views illustrating a process of forming still the electrode part of FIG. 4.

Figure 13:
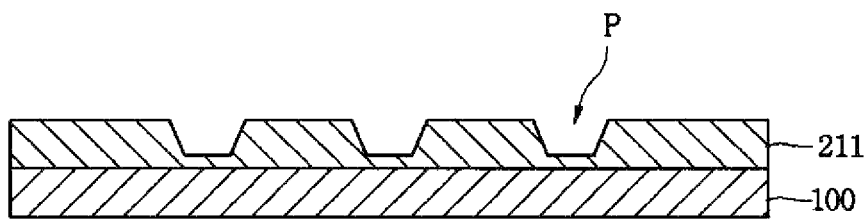
FIGS. 13 to 16 are views illustrating a process of forming still another electrode part of FIG. 4.

Referring to FIG. 13, the base substrate 211 may be disposed on the substrate 100. Then, the pattern part P may be formed at a constant width and height on the base substrate 211. In detail, the pattern part P having a mesh shape may be formed on the base substrate 211.

Figure 14:
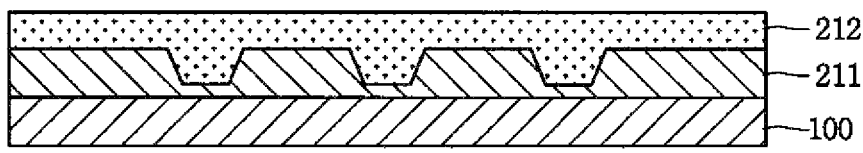

Next, referring to FIG. 14, the electrode layer 212 may be disposed on the base substrate 211. In detail, the metal electrode layer may be disposed on the base substrate 212.

The electrode layer 212 may be disposed on the base substrate 211 while filling the pattern part P. The electrode layer 212 may be deposited through an electroless plating scheme. By directly depositing the electrode layer 212 through the electroless plating scheme, the metal having a more excellent electric property than paste may be directly deposited on the base substrate.

In addition, since the electrode layer is deposited through the electroless plating scheme, the electrode layer may be deposited on the pattern part at a more uniform thickness when compared to the paste coating scheme.

Therefore, according to an embodiment, the thickness of the electrode part, that is, the thicknesses of the sensing electrode and the wire electrode may be reduced so that the thickness of the touch window may be reduced. In addition, since the electrode layer may be disposed at a uniform thickness, the reliability of the touch window may be improved.

Figure 15:
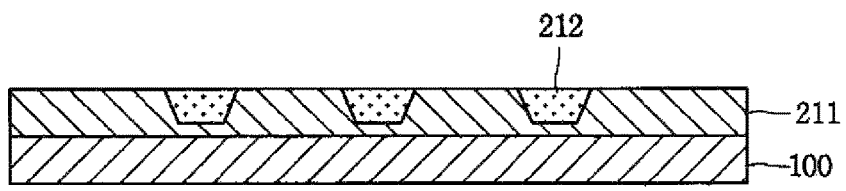

Referring to FIG. 15, the electrode layer 212 may be etched. In detail, the electrode layer may be removed through the etching except for a part of the electrode layer disposed in the pattern part 212 on the base substrate 211.

Figure 16:
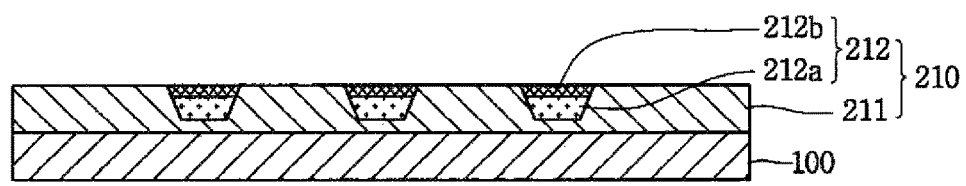

Then, referring to FIG. 16, the metal oxide layer may be formed by oxidizing the surface of the electrode layer 212. Thus, the electrode layer 212 may include a metal layer 212a and a metal oxide layer 212b. The metal oxide layer 212b including a black-based color, for example, at least one of black, white and a mixed color thereof may be formed by oxidizing the surface of the electrode layer 212. The metal oxide layer 212b may be nontransparent.

The metal oxide layer 212b may be oxidized through various schemes such as a physical or chemical scheme. For example, the electrode layer 212 may be oxidized by using chemical solution such as silver nitrate ($AgNO_3$) or by heating the surface of the electrode layer 212 at a constant temperature.

Hereinafter, a touch device, in which the above-described touch window and a display panel are coupled to each other, will be described with reference to FIGS. 17 to 19.

Figure 17:
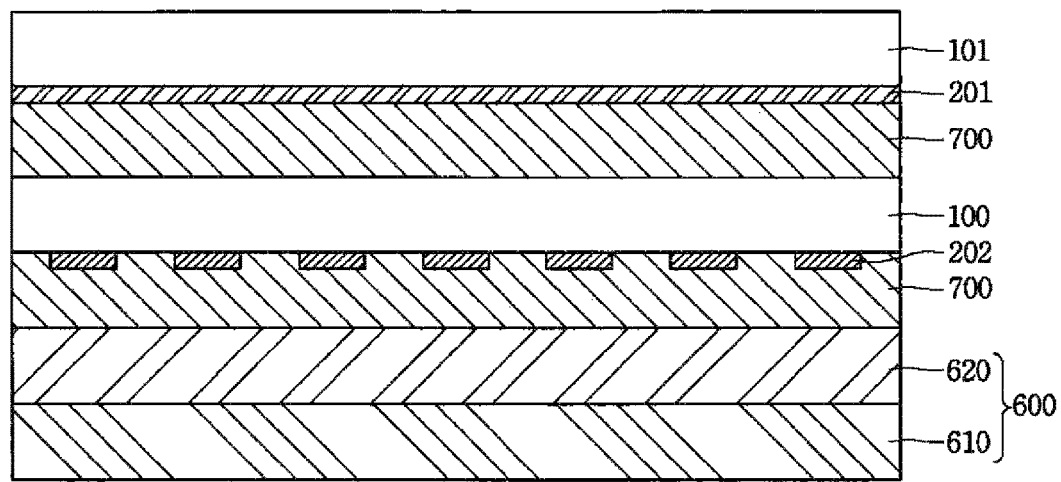
FIGS. 17 to 19 are views showing a touch device coupled to a touch window and a display panel according to an embodiment.

Referring to FIG. 17, the touch device according to an embodiment may include the touch window disposed on the display panel 600.

Referring to 17, a cover substrate 101 may be disposed on a substrate 100. The substrate 100 and the cover substrate 101 may be adhesive to each other through an adhesive layer 700. In addition, the first and second sensing electrodes 201 and 202 may be disposed on the substrate and/or the cover substrate 101. In addition, the substrate 100 and the display panel 600 may be adhesive to each other through an adhesive layer 700. For example, the substrate 100 and the display panel 600 may be bonded to each other through the adhesive layer 700 including optical clear adhesive (OCA). Thus, the separated formation of the cover substrate and the substrate may be advantageous to mass production of a touch window.

The display panel 600 may include first and second substrates 610 and 620.

If the display panel 600 is a liquid crystal display panel, the display panel 600 may have a structure in which the first substrate 610 including a thin film transistor (TFT) and a pixel electrode is combined with the second substrate 620 including color filter layers while a liquid crystal layer is interposed between the first and second substrates 610 and 620.

Further, the display panel 600 may be a liquid crystal display panel having a color filter on transistor (COT) structure formed by combining the first substrate 610 formed thereon with the TFT, a color filter, and a black matrix with the second substrate 620 while the liquid crystal layer is interposed between the first and second substrates 610 and 620. In other words, the TFT may be formed on the first substrate 610, a protective layer may be formed on the TFT, and the color filter layer may be formed on the protective layer. In addition, the pixel electrode, which makes contact with the TFT, is formed on the first substrate 610. In this case, to improve an aperture ratio and simplify a mask process, the black matrix may be omitted, and a common electrode may perform a function of the black matrix together with the inherent function thereof.

In addition, when the display panel 600 is a liquid crystal panel, the display device may further include a backlight unit for providing light at the back of the display panel 600.

When the display panel 600 is an organic light emitting device, the display panel 600 includes a self light-emitting device which does not require any additional light source. A thin film transistor is formed on the first substrate 610 of the display panel 600, and an organic light-emitting device (OLED) making contact with the thin film transistor is formed. The OLED may include an anode, a cathode and an organic light-emitting layer formed between the anode and the cathode. In addition, the display panel 600 may further include the second substrate 620, which performs the function of an encapsulation substrate for encapsulation, on the OLED.

Figure 18:
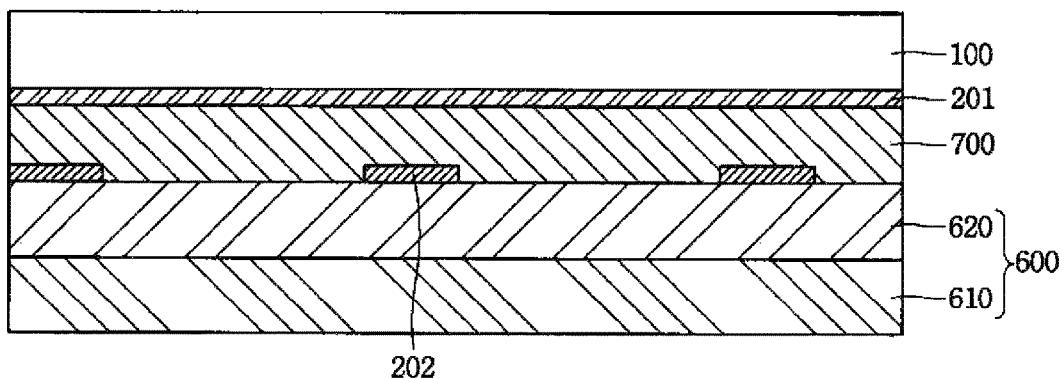

Referring to FIG. 18, a touch device according to an embodiment may include a touch window formed integrally with the display panel 600. That is, a substrate supporting at least one sensing electrode may be omitted.

In detail, at least one sensing electrode may be disposed on at least one surface of the display panel 600. That is, at least one sensing electrode may be formed on at least one surface of the first or second substrate 610 or 620.

In this case, at least one sensing electrode may be formed on a top surface of the substrate disposed at an upper portion.

Referring to FIG. 18, a first sensing electrode 201 may be disposed on one surface of the substrate 100. In addition, the first wire connected to the first sensing electrode 201 may be disposed on the one surface of the substrate 100. In addition, the second sensing electrode 202 may be disposed on one surface of the display panel 600. Further, the second wire connected to the second sensing electrode 202 may be disposed on the one surface of the display panel 600.

The adhesive layer 700 may be disposed between the substrate 100 and the display panel 600 so that the substrate 100 is combined with the display panel 600.

In addition, the substrate 100 may further include a polarizing plate below the substrate 100. The polarizing plate may be a linear polarizing plate or an anti-reflection polarizing plate. For example, when the display panel 600 is a liquid crystal display panel, the polarizing plate may be a linear polarizing plate. In addition, when the display panel 600 is an organic electroluminescent display panel, the polarizing plate may be an anti-reflection polarizing plate.

According to a touch device of an embodiment, at least one substrate 100 for supporting the sensing electrode 300 may be omitted. Thus, a touch device having a thin thickness and a light weight may be formed.

Next, a touch device according to still another embodiment will be described with reference to FIG. 19. In the following description, the parts similar or identical to those of the previously described embodiment will be omitted for the purpose of clear and brief description. The same reference numbers will be assigned to the same elements.

Figure 19:
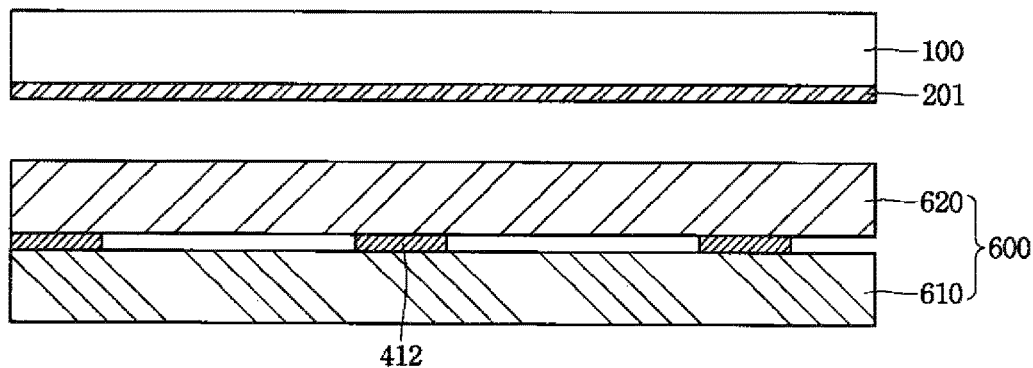

Referring to FIG. 19, a touch device according to an embodiment may include a touch panel integrated with the display panel 600. That is, the substrate for supporting at least one sensing electrode may be omitted.

For example, a sensing electrode, which serves as a sensor disposed in an active area to sense a touch, and a wire, through which an electrical signal is applied to the sensing electrode, may be formed inside the display panel. In detail, at least one sensing electrode or at least one wire may be disposed inside the display panel.

The display panel includes the first and second substrates 610 and 620. In this case, at least one of the first and second sensing electrodes 201 and 202 is disposed between the first and second substrates 610 and 620. That is, at least one sensing electrode may be disposed on at least one surface of the first or second substrate 610 or 620.

Referring to FIG. 19, the first sensing electrode 201 may be disposed on one surface of the cover substrate 100. In addition, the first wire connected to the first sensing electrode 201 may be disposed. Further, the second sensing electrode 202 and the second wire may be formed between the first and second substrates 610 and 620. Thai is, the second sensing electrode 202 and the second wire may be disposed inside the display panel, and the first sensing electrode 201 and the first wire may be disposed outside the display panel.

The second sensing electrode 202 and the second wire may be disposed on the top surface of the first substrate 610 or the rear surface of the second substrate 620.

In addition, a polarizing plate may be further provided at a lower portion of the cover substrate 100.

When the display panel is a liquid crystal display panel and the second sensing electrode is formed on the top surface of the first substrate 610, the sensing electrode may be formed with a thin film transistor (TFT) or a pixel electrode. In addition, when the second sensing electrode is formed on the rear surface of the second substrate 620, a color filter layer may be formed on the sensing electrode or the sensing electrode may be formed on the color filter layer. When the display panel is an organic light emitting device and the second sensing electrode is formed on the top surface of the first substrate 610, the second sensing electrode may be formed with a thin film transistor or an organic light emitting device.

The touch device according to an embodiment may allow at least one substrate supporting a sensing electrode 300 to be omitted. For this reason, the touch device having a thin thickness and a light weight may be formed. In addition, the sensing electrode and the wire are formed with a device formed on the display panel, so that the process may be simplified and the cost may be reduced.

FIGS. 20 to 23 are views showing one example of a touch device including a touch window described above.

Figure 20:
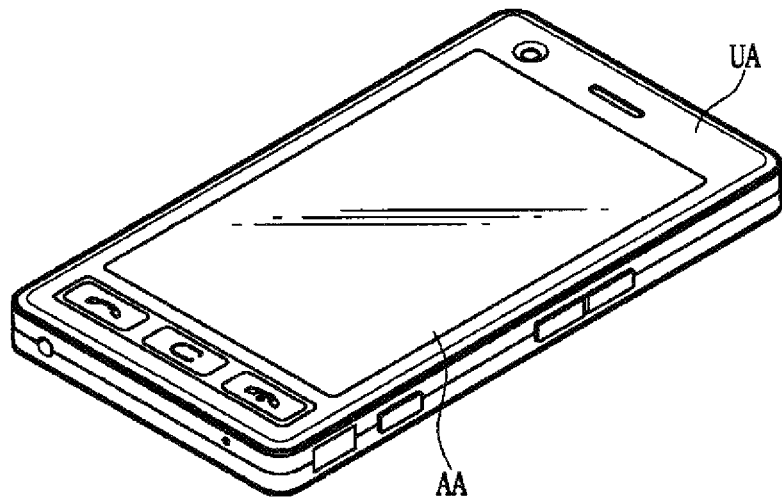
FIGS. 20 to 23 are views showing one example of a touch device to which a touch window according to an embodiment is applied.

Referring to FIG. 20, the mobile terminal may include an active area AA and an unactive area UA. The active area AA may sense a touch signal through the touch by a finger, and a command icon pattern part and a logo may be formed in the unactive area UA.

Figure 21:
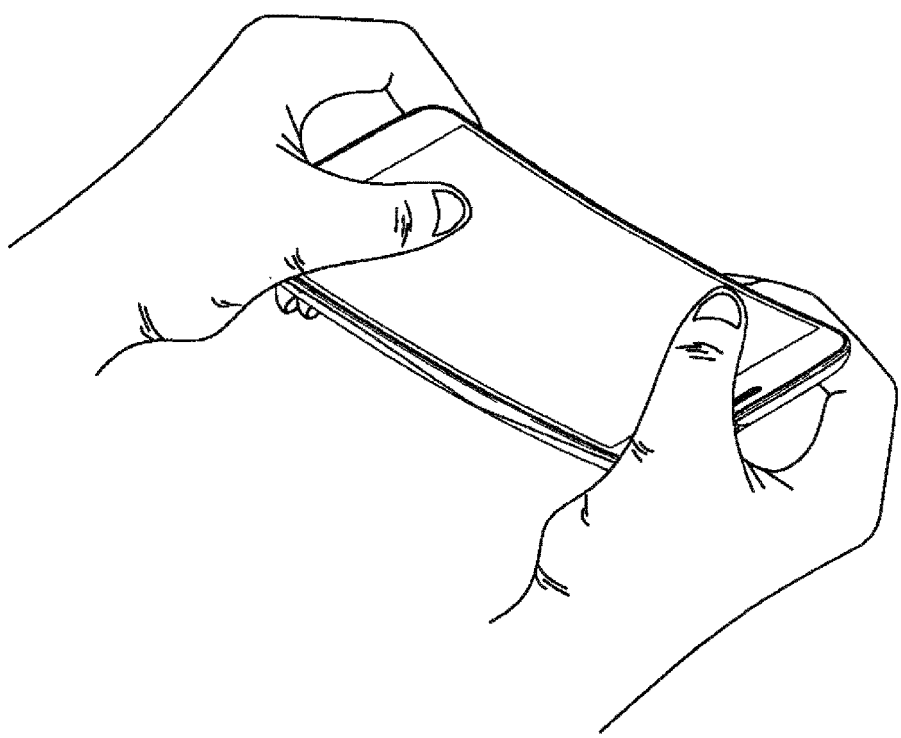

In addition, referring to FIG. 21, the touch window may include a flexible touch window that is capable of being bent. Accordingly, the touch display including the flexible touch window may be a flexible touch display. Thus, a user may bend or curve the flexible touch window with the hand of the user.

For example, such a flexible touch window may be applied to implement a wearable touch. That is, the wearable touch may be implemented by applying the flexible touch window to glasses or a watch worn on a human body.

Figure 22:
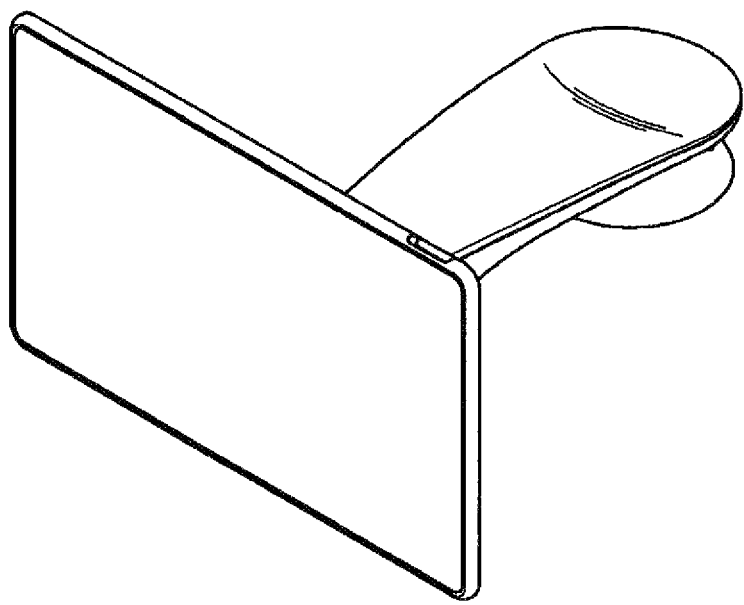

In addition, referring to FIG. 22, the touch window may be applied to a vehicle navigation system.

Figure 23:

In addition, referring to FIG. 23, the touch window may be applied to an inner part of a vehicle. In other words, the touch window may be applied to various parts in the vehicle. Accordingly, the touch window may be applied to a dashboard 100 as well as a PND (Personal Navigation Display), so that a CID (Center Information Display) may be realized. However, the embodiment is not limited to the above, and such a touch device may be used for various electronic appliances and of course, applied to wearable devices worn on such a human body.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch window comprising:
a substrate; and
an electrode part on the substrate,
wherein the electrode part comprises:
a base substrate formed with a pattern part; and
an electrode layer on the pattern part,
wherein an anti-reflective layer is disposed only on the electrode layer in the pattern part,
wherein the electrode layer has a thickness in a range of 0.03 μm to 3 μm,
wherein the pattern part includes a first surface, a second surface, and a third surface for connecting the first and second surfaces to each other,
wherein the electrode layer is disposed on an inner side surface of the pattern part connecting with the first surface, the second surface and the third surface,
wherein the electrode layer is disposed in a shape corresponding to the first surface, the second surface and the third surface,
wherein the anti-reflective layer includes a contact surface making contact with the electrode layer and a contactless surface exposed to an outside,
wherein the anti-reflective layer is surrounded by the electrode layer,
wherein the contact surface is disposed in a shape corresponding to the electrode layer, and
wherein the area of the contact surface is greater than that of the contactless surface.

2. The touch window of claim 1, wherein the electrode layer has a mesh shape.

3. The touch window of claim 1, wherein the electrode layer includes a plating layer.

4. The touch window of claim 1, wherein the base substrate includes a bottom surface making contact with the substrate and a top surface opposite to the bottom surface, and
the electrode layer has a width gradually enlarged from the bottom surface to the top surface.

5. The touch window of claim 1, wherein the pattern part includes a first surface, a second, surface and a third surface connecting the first and second surfaces to each other, and-the electrode layer makes contact with at least one of the first to third surfaces.

6. The touch window of claim 1, wherein the thickness of the electrode layer is different from a thickness of the anti-reflective layer.

7. The touch window of claim 1, wherein the thickness of the electrode layer is greater than a thickness of the anti-reflective layer.

8. The touch window of claim 1, wherein the thickness of the electrode layer is less than a thickness of the anti-reflective layer.

9. The touch window of claim 1, wherein the electrode layer has a width in a range of 1 μm to 4 μm.

10. The touch window of claim 1, wherein the electrode part includes at least one of a sensing electrode and a wire electrode.

11. The touch window of claim 1, wherein the electrode part includes a sensing electrode,
the sensing electrode includes a first sensing electrode and a second sensing electrode which extend in mutually different directions, and
the first and second sensing electrodes are disposed on at least one of one surface and an opposite surface of the substrate.

12. The touch window of claim 1, further comprising a cover substrate on the substrate.

13. A touch window comprising:
a substrate; and
an electrode part on the substrate,
wherein the electrode part comprises:
a base substrate formed with a pattern part; and
an electrode layer on the pattern part,
wherein an anti-reflective layer is disposed only on the electrode layer in the pattern part,
wherein the electrode layer includes a metal layer and a metal oxide layer on the metal layer, wherein the pattern part includes a first surface, a second surface, and a third surface for connecting the first and second surfaces to each other, wherein the electrode layer is disposed on an inner side surface of the pattern part connecting with the first surface, the second surface and the third surface, wherein the electrode layer is disposed in a shape corresponding to the first surface, the second surface and the third surface, wherein the anti-reflective layer includes a contact surface making contact with the electrode layer and a contactless surface exposed to an outside, wherein the anti-reflective layer is surrounded by the electrode layer, wherein the contact surface is disposed in a shape corresponding to the electrode layer, and wherein the area of the contact surface is greater than that of the contactless surface.

14. The touch window of claim 13, wherein the metal layer and the metal oxide layer are formed integrally with each other.

15. The touch window of claim 13, wherein the metal layer has a thickness greater than a thickness of the metal oxide layer.

16. The touch window of claim 13, wherein the metal layer and the metal oxide layer include metals corresponding to each other.

17. The touch window of claim 13, wherein the metal oxide layer includes at least one of black, gray and a mixed color thereof.

* * * * *